April 11, 1967  M. C. ROZZI  3,313,839
PREPARATION OF SULFATE ESTERS BY THE REACTION OF
CHLOROSULFONIC ACID WITH ALKOXYLATED
ALKYL PHENOLS
Filed July 1, 1963
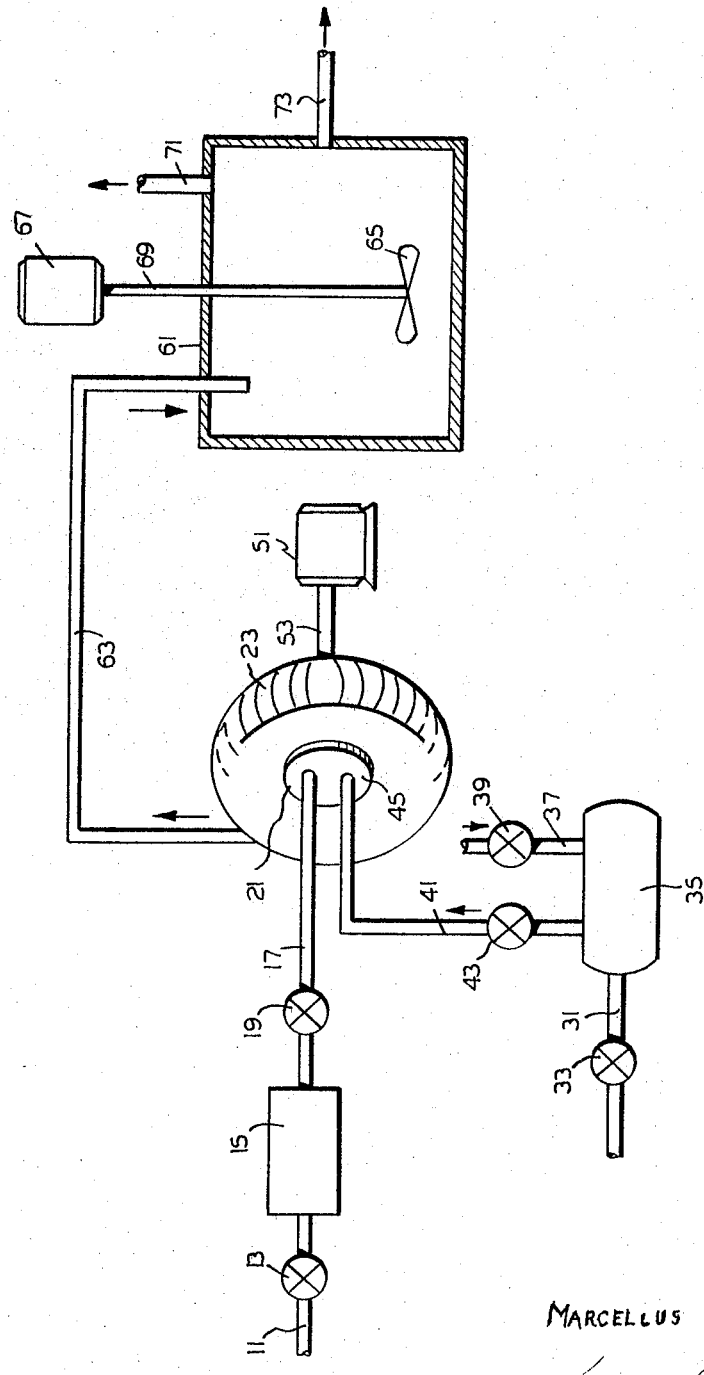
INVENTOR
MARCELLUS C. ROZZI
BY
ATTORNEYS sulfonic acid is used, produces gaseous hydrogen chloride and the present invention includes as a further object the substantially complete and prompt separation of such gaseous material from the main reaction product which is a liquid.

United States Patent Office 3,313,839
Patented Apr. 11, 1967

3,313,839
PREPARATION OF SULFATE ESTERS BY THE REACTION OF CHLOROSULFONIC ACID WITH ALKOXYLATED ALKYL PHENOLS
Marcellus C. Rozzi, Colonia, N.J. assignor to General Aniline & Film Corporation, New York, N.Y., a corporation of Delaware
Filed July 1, 1963, Ser. No. 291,722
6 Claims. (Cl. 260—458)

The present invention relates to an improved process and apparatus for the continuous production of sulfated organic compounds. It has particular application to a process and apparatus by which there may be produced continuously the reaction products of a powerful sulfating or sulfonating agent, particularly such an agent as chlorosulfonic acid, with organic compounds. A special feature of the invention is that it makes sulfation or sulfonation possible without the charring and discoloration which commonly occur in reactions of this type.

Many processes, and many apparatus and production systems have been devised for the reaction of chemicals of the general type to which this invention pertains. The treatment of various chemicals with sulfuric acid or with oleum or related materials such as sulfur trioxide, sulfane, etc., is a process well known in the art. The processes and apparatus for carrying out such processes are employed extensively in commercial operations.

It has also been known in the prior art that there are often advantages in the use of chlorosulfonic acid for sulfating instead of such materials as oleum, sulfan, or sulfuric acid. This is because the chlorosulfonic acid has less tendency to char, to discolor, and to affect the quality of the finished product. Both quality and problems of yield may be encountered when using the other sulfating agents. Even with chlorosulfonic acid, however, there is some tendency to cause char and discoloration. Hence one important object of the present invention is to make available a process, and reaction equipment or apparatus, which will prevent such char and discoloration and loss of yield as occurs in the prior art.

Another and primary object of this inevntion is to devise a reactor system which provides (1) for very effective and rapid contacting between the liquid reagents, (2) a short contact time so as to minimize color degradation, and (3) a system both process- and apparatus-wise which minimizes foaming properties which otherwise may be encountered. In the prior art such problems as foaming are often met, particularly in processes where voluminous gaseous reaction products or by-products must be removed, i.e., such gaseous by-products, for example, as hydrogen chloride.

According to the present invention, a reaction vessel is combined with a powerful and efficient mixing device, such combination being designed for a very short contact time but nevertheless an effective chemical reaction between the reactants. The apparatus of the present invention is not only designed to obtain intimate mixing and immediate reaction between the ingredients so as to make possible a complete reaction in a minimum of time, but also is designed to supply the needed pressure or propelling force for the whole operation. The reaction rate and retention time are designed to minimize the degree of color degradation and the side reactions which otherwise result in formation of low grade products or objectionable by-products.

In reactions of the type under consideration, particularly those wherein gaseous or vaporous by-products are formed in substantial volume, it is important to minimize the foaming difficulties. The main reaction, when chlorosulfonic acid is used, produces gaseous hydrogen chloride and the present invention includes as a further object the substantially complete and prompt separation of such gaseous material from the main reaction product which is a liquid.

By use of properly designed apparatus, which will obtain intimate mixing at high shear rates, complete liquid-liquid contact is achieved, in a minimum of time. The reaction may be started in the mixing zone where residence time is extremely short, normally of much less duration than one second of time. The reaction goes forward quickly, continuing in a retaining vessel, to produce the desired primary reaction product. The reaction product may be removed from the reaction zone or retaining vessel very shortly and neutralized. In this way, there is little opportunity for any substantial masses of strong acidic material to char the organic material, as would occur with slower or inadequate mixing.

In broad terms, then, the invention involves a process for quickly and effectively reacting two liquid chemical agents, particularly a liquid sulfating or sulfonating agent, such as chlorosulfonic acid, with a liquid organic material. The latter is preferably an alcohol. The reaction is accomplished rapidly and preferably continuously, starting with the mixing, in such a manner as to minimize charring and discoloration of the main reaction product.

The invention also comprises a method and an apparatus or mechanical means for energetically mixing the organic material and the sulfating agent and simultaneously applying propulsion and pressure (superatmospheric) thereto. A power input is available which is used to apply a high shearing rate to the liquid reactants, sufficient to effect the necessary intimate mixing in a very minimum period of time. After mixing, the reaction mixture is promptly passed, by the pressure directly applied thereto by the mixing means, into a reactor vessel. There it is permitted to continue reacting for a short time. The reactor vessel is so designed as to permit prompt separation of the gaseous and vaporous by-products that arise from the reaction. By affording this opportunity for gas separation in the vesssel, which vessel preferably is essentially unpressurized, a substantially complete and almost instantaneous separation of gaseous by-products such as hydrogen chloride is obtained. Hence, the principal reaction product, which is a liquid, may then promptly be removed from the vessel and neutralized. In this way there is obtained the desired final product which is essentially neutral and is useful as a detergent, as an additive in textile dyeing and finishing, etc.

More specifically, the present invention involves a combination of a relatively powerful centrifugal pump, which also acts as a high rate shearing device in combination with a reaction vessel which serves as a gas separator. The apparatus is especially useful for production of such materials as sulfated organic surface active agents. Various long chain or complex organic alcohols and related materials are the preferred starting materials. The sulfated products which result are neutralized with alkali metal or ammonium hydroxides, or equivalent. The products also have other uses, as is now well known in the art.

A particularly desirable material for the organic component is one derived by condensation of alkylated phenols, e.g., $C_6$ to $C_{12}$ alkylated phenols, with alkylene oxides such as ethylene oxide or propylene oxide. These condensed materials, which have certain surface active properties in and of themselves prior to sulfation, sulfonation or other treatment, are adapted to produce excellent reaction products when first sulfated with a suitable agent such as oleum, sulfuric acid, or preferably chlorosulfonic acid, and then later neutralized.

Organic materials and acids of the type described above can be fed together to the apparatus of this invention and reacted there to produce products of good quality and uniformity in high yields and with a minimum of the disadvantages of prior art products and processes.

The invention will be more fully understood by referring to the accompanying drawing and the detailed description which follows. In the drawing, the single figure shows diagrammatically a typical apparatus adapted to carry out the process and thus obtain the advantages discussed above.

Referring now to the drawing, there is shown a supply or feed line 11 under control of a valve 13 through which organic material, preferably an organic alcohol, particularly a condensation product of the type mentioned above, is supplied to a surge vessel 15. The purpose of this vessel is to stabilize the flow of this liquid into the reaction system. A line 17, under control of a valve 19, leads the organic liquid to the eye or intake 21 at or near the center of a centrifugal pump 23.

A supply of the sulfating or sulfonating agent, preferably chlorosulfonic acid, also enters the intake of the centrifugal pump. It is fed from a suitable source, not shown, through a line 31 under control of a valve 33 into a surge and supply drum 35. The latter may be pressurized intermittently with a suitable gas, preferably an inert gas such as nitrogen, through line 37 under control of valve 39. An outlet line 41 under control of valve 43 is provided for controlling the flow of the acid, impelled by the gas pressure, into the intake 21 of the centrifugal pump 23. Line 41 preferably enters near the center of the pump but it may, if desired, join line 17 before entering the pump. As shown in this particular embodiment it is provided with a separate entrance 45.

The centrifugal pump 23 is driven by a sufficiently powerful motor 51 through shaft 53 to give it a high shear rate as well as to pressurize the materials supplied to it. This is done in order that full and adequate agitation and intimate contacting of the two liquids may be assured within an extremely short time period. The pump should be so designed and powered as to impart an energy of at least 2.5 and preferably 3.5 to 10 watts per gram per minute, to the mixture of the two liquids as passed through the pump. From the pump 23, the mixture is forwarded under some pressure directly to a reaction vessel 61. A line or conduit 63 connects the centrifugal pump to the vessel 61. The reaction vessel 61 is preferably provided with a stirrer 65, driven by a motor 67 through a shaft 69 in conventional fashion. This stirrer, however, is not always essential though it is useful when the reaction is to continue for an appreciable time period. Assuming adequate mixing in pump 23, the likelihood of charring and discoloration in vessel 61 is much reduced. Hence the mixture may be permitted to remain for a time period of 1 to 10 minutes or more. Usually a time period of 2 to 5 minutes residence in vessel 61 is quite suitable.

The reaction vessel 61 is provided with an outlet at the top, indicated at 71, for vaporous and gaseous materials such as by-products in the reaction process. An outlet for the product of reaction is indicated at 73. In continuous production, gas flows continuously out of line 71 and the main reaction product, a liquid, overflows continuously through line 73.

It will be understood that the reaction products are usually neutralized to make them suitable for various uses. However, the acidic intermediates are first produced by contacting the liquid sulfating agent by rapid and thorough mixing, with the liquid organic material. These materials are mixed energetically in the centrifugal pump 23 primarily to affect such quick and intimate contact that mixture of the two liquids is substantially complete before charring can occur. In order to accomplish this result, the energy rate in the mixer-pump should be substantial. As noted above, a suitable rate is at least 2.5 watts per gram per minute, preferably 3.5 grams or more and may be up to about 10 watts per gram.

An obvious advantage of this particular arrangement is that the centrifugal pump which actually accomplishes the mixing also serves to apply the impelling and pressurizing force necessary to move the mixture at suitable velocity into the reaction zone. The reaction vessel 61 may be at substantially atmospheric pressure (unpressurized) or it may have a moderate pressure if desired. The reactants in line 63 are, of course, under some pressure. It is generally preferred to operate the reactor 61 at about atmospheric pressure so that the liquids which are reacting, as well as the reaction products which settle towards the bottom may quickly be relieved of their gaseous content, i.e., of by-products such as hydrogen chloride. However, if pressurizing is desired, under some conditions and with certain feed materials, the equipment can supply it. In such case the outlets 71, 73 are provided with valves and controls.

In order to accomplish this combined mixing and propelling function, the pump 23 should have such capacity and be so driven as to impel the liquid mixture at a linear velocity through line 63 of about 5 to 20 feet per second or more through line 63. In one typical operation, the impelling rate was in the neighborhood of 15 feet per second through this line.

The reaction vessel 61 is preferably sized, in proportion to the feed rate, so as to complete the reaction within a suitable time period. As noted above, this may be between about 1 and 10 minutes, preferably about 2 to 5 minutes. It is not desirable that the material remain in the reaction zone for appreciably longer times than 10 minutes, in most cases, because of possible oxidation and/or discoloration. Moreover, the intimate contacting effected by the centrifugal pump promotes rapid reaction so that the longer contact times usually are entirely unnecessary.

The main reaction product, which is acidic, aside from the acid gases or vapors which are released through line 71, is taken off the reactor at line 73 either intermittently or continuously, preferably the latter. It may then be neutralized to obtain the final desired product. In case of batch operation, where the centrifugal pump 23 is shut off, the vessel 61 may be used to neutralize the intermediate. In this case, the neutralizing material may be added in any suitable manner, as through opening 71, and the stirrer 65 may be operated for mixing.

While the treatment of organic alcohols is particularly contemplated, it will be understood that various other organic compounds may be treated in the apparatus. For sulfation or sulfonation to make detergents, the organic materials preferably are hydroxyl compounds such as alcohols. The contacting energy and residence times stated above are suitable, particularly for organic materials of the type obtained by reacting or condensing alkyl phenols with alkylene oxides, such as ethylene oxide. The intermediate products so produced have various uses and the neutralized products have excellent utility for many purposes, including use as detergents and as surfactants in general as already mentioned.

The invention will be more fully understood by referring to a specific example.

*Example 1*

A condensation product of a long chain alkylated phenol (approximately $C_9$ in the alkyl group) with ethylene oxide was used as the organic starting material. The particular product used is sold by General Dyestuff Corporation under the trade name "Igepal CO-430." It was continuously fed to the centrifugal pump suction line of the apparatus described above through a suitable metering device. Chlorosulfonic acid was fed simultaneously, through its separate line, also into the suction of the pump. Feed was facilitated by means of applied inert gas pressure at line 37. A molar ratio of 1.2 to 1 of chlorosulfonic acid liquid to the liquid "Igepal CO-430" was used.

No attempt was made to control the temperature of the reaction. Temperature rise was modest, however. The high speed of contacting and the intimate contact obtained appears to cause the reaction to occur to completion so that temperature rise is largely determined by feed rates. These, of course, can be carefully controlled. The resulting temperature in the reaction, at the feed rates employed in this particular example ranged between about 52° and 56° C. The starting materials were at room temperature, around 25° C. Activity of the free acid intermediate thus produced was analyzed and found to be between 88 and 89%. Feed rates were such as to permit about 3 to 4 minutes residence in the reactor vessel.

The resulting acidic reaction product was neutralized with ammonium hydroxide by continually feeding the acidic product into an agitated vessel containing the ammonium hydroxide and ethyl alcohol. Analysis of the neutralized material was made, with the following results:

| | |
|---|---|
| Color VCS | 10 |
| Percent sulfuric acid | 5.1 |
| Percent $NH_4Cl$ | 1.13 |
| Activity | 63.4 |
| Yield, percent | 99.5 |

Obviously, various modifications may be made in the apparatus described above. Moreover, since other sulfating agents then chlorosulfonic acid may be employed, the provision for degasification of the reaction product may be unnecessary or the volume of gas to be removed may be much less and the degasification less of a problem.

It will be understood also that the employment of a relatively powerful centrifugal pump both to propel and/or to pressurize the liquid as well as to effect the intimate contacting in an extremely short period of time is an important feature of the invention. While any centrifugal pump would inherently have some mixing function, the high shear rates involved here are an important requirement.

Obviously various modifications may be made in various elements of the apparatus. It is intended by the claims which follow to cover such modifications and variations as would occur to those skilled in the art, within the limitations imposed by the state of the prior art.

What is claimed is:

1. In a process for producing neutral sulfated alkoxylated alkyl phenols which consists essentially of reacting liquid chlorosulfonic acid with a liquid alkoxylated alkyl phenol and subsequently neutralizing, the improvement which comprises, in combination, the steps of subjecting the said liquid materials to centrifugal force at superatmospheric pressure in a zone of energetic shearing for quickly and intimately mixing said liquids with an energy of at least 2.5 watts per gram per minute and for a time period not exceeding 1 second, forcing the mixture promptly from the shearing zone into a relatively unpressured reaction zone to produce a liquid reaction product and a gaseous by-product, venting the gaseous by-product and recovering a substantially degasified liquid sulfated alkoxylated alkyl phenol.

2. A process according to claim 1 wherein the pressure in said shearing zone is sufficient to impart to said mixture a linear velocity of at least 5 feet per second between the said shearing zone and said subsequent unpressured reaction zone.

3. Process according to claim 1 in which the alkoxylated alkyl phenol is a condensation product of a $C_6$ to $C_{12}$ alkylated phenol and an agent selected from the group consisting of ethylene oxide and propylene oxide.

4. A process according to claim 1 wherein energy is imparted by the equipment to the extent of 3.5 to 10 watts per gram per minute in the shearing zone.

5. A process according to claim 1 wherein the said liquid materials are subjected to centrifugal force in the shearing zone for less than one second of time.

6. A process according to claim 1 wherein the mixture of agent and material is forced into the reaction zone at a minimum linear velocity of at least 10 feet per second.

References Cited by the Examiner

UNITED STATES PATENTS

| | | | |
|---|---|---|---|
| 2,187,244 | 1/1940 | Mills | 260—459 |
| 2,190,136 | 2/1940 | Oberg | 23—284 |
| 2,613,218 | 10/1952 | Stoneman | 260—458 X |
| 2,616,936 | 11/1952 | Mammen et al. | 260—458 X |
| 2,634,287 | 4/1953 | Fincke | 260—459 |
| 2,673,211 | 3/1954 | Blinoff | 260—459 |
| 2,697,031 | 12/1954 | Hervert | 23—284 |
| 2,708,675 | 5/1955 | Slagh | 260—457 |
| 2,758,977 | 8/1956 | Knowles et al. | |
| 2,771,484 | 11/1956 | Blaser et al. | 260—459 |
| 2,828,331 | 3/1958 | Marisic et al. | 260—401 X |
| 2,854,476 | 9/1958 | Chemicek et al. | 260—457 X |
| 2,865,958 | 12/1958 | Davies et al. | 260—686 |
| 2,923,728 | 2/1960 | Falk et al. | 260—459 |
| 2,931,822 | 4/1960 | Tischbirek | 260—459 |
| 2,970,165 | 1/1961 | Michel et al. | 260—457 |
| 3,024,258 | 3/1962 | Brooks et al. | 260—459 X |
| 3,055,929 | 9/1962 | Bozzetto | 260—459 |
| 3,169,142 | 2/1965 | Knaggs et al. | 260—457 |

FOREIGN PATENTS 164,105  11/1953  Australia.

OTHER REFERENCES

Ser. No. 83,244, Reibnitz (A.P.C.), published June 1943.

CHARLES B. PARKER, *Primary Examiner.*

F. D. HIGEL, *Assistant Examiner.*